United States Patent

Ruster et al.

[15] 3,637,949

[45] Jan. 25, 1972

[54] MOUNTING OF THE DIAL SWITCH

[72] Inventors: Heinz Ruster; Gunter Schwanck, both of Berlin, Germany

[73] Assignee: International Standard Electric Corporation, New York, N.Y. by said Schwanck

[22] Filed: Sept. 15, 1969

[21] Appl. No.: 9,463

[30] Foreign Application Priority Data

May 29, 1969 Germany ......................P 19 27 441.0

[52] U.S. Cl. ..........................179/100 R, 179/90 R, 179/179
[51] Int. Cl. ..........................................................H04m 1/23
[58] Field of Search ............179/100 D, 100 R, 90 FW, 90 A, 179/90 R, 178, 179

[56] References Cited

UNITED STATES PATENTS 2,812,387 11/1957 Safarik...............................179/100 D
2,819,355 1/1958 Sargisson et al. ....................179/90 A
2,862,063 12/1958 Wood ...............................179/100 D

FOREIGN PATENTS OR APPLICATIONS 1,080,621 4/1960 Germany .........................179/90 FW

*Primary Examiner*—Kathleen H. Claffy
*Assistant Examiner*—Randall P. Myers
*Attorney*—C. Cornell Remsen, Jr., Walter J. Baum, Percy P. Lantzy, J. Warren Whitesel, Delbert P. Warner and James B. Raden

[57] ABSTRACT

A dial switch is mounted inside a subset housing with the aid of a bayonet lock. Engagement in the end position is effected by means of a flexible latch detachably snapping into a groove of the housing.

2 Claims, 2 Drawing Figures

PATENTED JAN 25 1972 3,637,949

MOUNTING OF THE DIAL SWITCH

The present invention relates to the mounting of the dial switch in the cover portion of a telephone subset.

In one conventional type of embodiment the dial switch is mounted with the aid of a U-shaped bracket to the cover of the housing of the telephone subset which, with the aid of two screws or screwbolts, is pulled against the baseplate of the dial switch and, in so doing, is tensioned with the two ends of the limbs against the inside of the cover portion. This type of mounting arrangement, however, requires expensive turned pieces and assembling works which are rather wage-intensive, as well as a metal type of baseplate at the dial switch. Moreover, it favors the transfer of noises of the running switch, to the housing.

In trying to dampen these noises, a solution has been applied to recent types of subsets, in which the dial switch is mounted to the baseplate with the aid of two rubber receptacles. This, of course, was suitable to remove one disadvantage but the rubber receptacles, in turn, required a mounting bracket and screws.

It is the object of the present invention to provide a mounting arrangement for the dial switch, completely avoiding the additional mounting parts, and considerably reducing the times required for the assembly. According to the invention this is accomplished in that in the opening of the cover portion of the housing there are arranged several inwardly projecting, die-cast segmentlike supporting ribs for the dial switch and which, at the same end when looked at in one direction of rotation, are provided with a limiting stop nose against which there rests a corresponding holding flap of the baseplate of the dial switch, engaging behind the respective supporting rib, and partly covering the peripheral deepening or recess for receiving the supporting rib in the baseplate, and in that the dial switch is detachably fixed in position by means of a flexible latching projection which, in its end position, engages one groove provided in the cover portion of the housing.

According to an advantageous further embodiment this groove is arranged on the inside of the carrying mold (pocket) of the cover portion of the housing.

This type of mounting arrangement requires neither screws nor similar parts, or tools for mounting or assembling the dial switch, which may be carried out equally well either manually or mechanically (by machine). Likewise, it is easy for the repair man to replace a defective dial switch by a new one.

Figure 1:
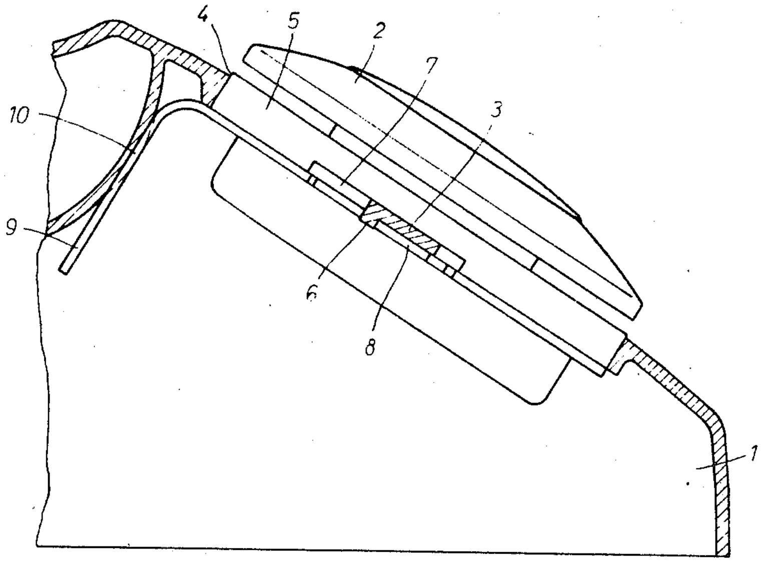
Figure 2:
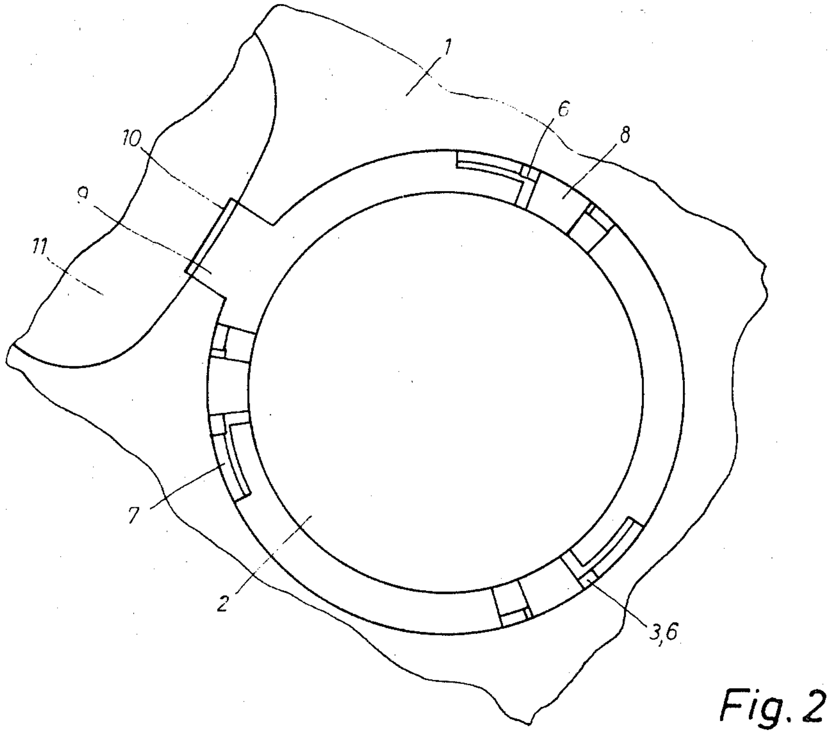

The invention will now be described with reference to FIGS. 1 and 2 of the accompanying drawing, in which:

FIG. 1 shows the front portion of the housing of a telephone subset comprising the dial switch, in a longitudinal sectional view, and FIG. 2 shows the inside view of this part of the housing according to FIG. 1.

In FIGS. 1 and 2 the cover portion of the subset housing made from a plastics material is indicated by the reference numeral 1, and the dial switch as mounted therein, by the reference numeral 2. The mounting itself is effected in the following way: the dial switch 2 is inserted from the outside of the cover portion 1 of the subset housing, into the specially provided circular opening 4. In this opening 4 there are arranged several radially extending and inwardly projecting segmentlike supporting ribs 3 which are distributed along the circumference of said opening 4, with the supporting ribs 3 being diecast to the cover portion 1 of the subset housing. They are countersunk to such an extent that the surface of the baseplate 5 of the inserted dial switch 2 will be in alignment with the outer contours of the cover 1. Either all or some of the supporting ribs are provided at the one end of their supporting surface, with a limiting stop nose or portion 6.

The baseplate 5 of the dial switch 2 is provided on its supporting side with recesses 7 corresponding to the ribs 3 which are sufficiently twice as long as the ribs, so that the dial switch is capable of being turned inside the opening 4. At about half the length of each recess 7 there is arranged a respectively radial outwardly directed holding flap 8, covering up the recess. In the axial direction, and below the holding flap, there is so much space in the recess that the rib 3 will fit in therebetween, so that the dial switch 2, after having been inserted in the opening 4, and when being turned, will engage with the holding flaps 8 behind the supporting ribs 3 until the flaps meet against the limiting stop noses or portions 6. In this way the dial switch 2 is held in the desired end position.

In order to prevent the dial switch 2 from becoming unintentionally loose in this position, a latching projection 9 of the dial switch 2 engages a groove 10 specially provided to this end in the cover portion 1 of the housing. In the shown example this groove is arranged at the carrying mold (pocket) 11 on the inside of the cover portion of the subset housing, but this latching might just as well be arranged at any other part, for example, near the front wall of the cover 1.

For the purpose of detaching the dial switch 2 the flexible latching projection 9 is lifted off by hand, and the whole dial switch 2 is turned until being in a position for being taken out. The latching projection 9 is either shaped to the baseplate 5, or is mounted as a separate part thereto.

We claim:

1. An arrangement to enable mounting a dial switch to a telephone subset through the top cover of the subset, comprising a telephone subset cover, an opening in the cover, a plurality of inwardly projecting die-cast, segmentlike supporting ribs integral to the cover and arranged within the opening to face inwardly, a plurality of limit stops integral with said ribs, a dial switch having a baseplate, a plurality of holding flaps integral to said baseplate, said holding flaps providing peripheral recesses around the edge of said dial switch to engage behind respective supporting ribs, said dial switch including a flexible latching projection which, in one position, engages a groove provided in the cover of the housing, for holding the dial switch locked in position in the housing.

2. A dial switch mounting arrangement according to claim 1, in which the groove is arranged on the inside of the carrying mold of the cover of the subset housing.

* * * * *